United States Patent
Ma et al.

(10) Patent No.: US 12,457,555 B2
(45) Date of Patent: Oct. 28, 2025

(54) SYSTEM AND METHOD FOR PDCCH MONITORING

(71) Applicant: ZTE CORPORATION, Guangdong (CN)

(72) Inventors: Xiaoying Ma, Shenzhen (CN); Jun Xu, Shenzhen (CN); Mengzhu Chen, Shenzhen (CN); Yuzhou Hu, Shenzhen (CN); Qiujin Guo, Shenzhen (CN); Hong Tang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 356 days.

(21) Appl. No.: 18/139,754

(22) Filed: Apr. 26, 2023

(65) Prior Publication Data

US 2023/0345370 A1    Oct. 26, 2023

Related U.S. Application Data

(63) Continuation of application No. PCT/CN2021/072055, filed on Jan. 15, 2021.

(51) Int. Cl.
H04W 52/02 (2009.01)
H04W 72/232 (2023.01)
H04W 76/28 (2018.01)

(52) U.S. Cl.
CPC ..... H04W 52/0229 (2013.01); H04W 72/232 (2023.01); H04W 76/28 (2018.02)

(58) Field of Classification Search
CPC ........... H04W 52/0229; H04W 72/232; H04W 76/28; H04W 56/005; H04W 52/00;
(Continued)

(56) References Cited

U.S. PATENT DOCUMENTS

| | | | |
|---|---|---|---|
| 2012/0155309 A1* | 6/2012 | Bae | H04W 76/28 370/252 |
| 2012/0257559 A1* | 10/2012 | Kim | H04W 56/005 370/311 |

(Continued)

FOREIGN PATENT DOCUMENTS

| | | |
|---|---|---|
| CN | 109076552 A | 12/2018 |
| CN | 110876185 A | 3/2020 |

(Continued)

OTHER PUBLICATIONS

International Search Report and Written Opinion for PCT Appl. No. PCT/CN2021/072055, mailed Sep. 29, 2021 (9 pages).

(Continued)

*Primary Examiner* — Kiet Tang
(74) *Attorney, Agent, or Firm* — Foley & Lardner LLP

(57) ABSTRACT

A system and method for changing one or more discontinuous reception (DRX) parameters. The system and method includes receiving, by a wireless communication device, a high layer signaling including N sets of DRX parameters, the N is an integer greater than or equal to 1; performing, by the wireless communication device, at least one of the following behaviors when a predefined condition is satisfied: changing a physical downlink control channel (PDCCH) monitoring behavior; determining at least one set of DRX parameters among the N sets of DRX parameters, or monitoring the PDCCH during an active time that is determined according to the set of DRX parameters

18 Claims, 9 Drawing Sheets

(58) Field of Classification Search
CPC ..... H04L 5/006; H04L 5/0064; H04L 5/0085; H04L 5/0053; H04L 5/0096; H04L 5/0023; H04L 5/0087; Y02D 30/70
See application file for complete search history.

(56) References Cited

U.S. PATENT DOCUMENTS

2013/0272148 A1* 10/2013 Fong ........................ H04L 5/14
370/312
2022/0151015 A1* 5/2022 Lu ........................ H04W 76/28

FOREIGN PATENT DOCUMENTS

| EP | 3 681 207 A1 | 7/2020 |
|----|--------------|--------|
| WO | WO-2020/198594 A1 | 10/2020 |
| WO | WO-2020/223654 A1 | 11/2020 |

OTHER PUBLICATIONS

Extended European Search Report on EP Appln No. 21918529.5, dated Dec. 12, 2023 (8 pages).

\* cited by examiner

900 receiving, by a wireless communication device, a high layer signaling including N sets of discontinuous reception (DRX) parameters; wherein the N is an integer greater than or equal to 1
902 performing, by the wireless communication device, at least one of the following behaviors when a predefined condition is satisfied
904 changing a physical downlink control channel (PDCCH) monitoring behavior
906 determining at least one set of DRX parameters among the N sets of DRX parameters
908 monitoring the PDCCH during an active time that is determined according to the set of DRX parameters
910

FIG. 9

SYSTEM AND METHOD FOR PDCCH MONITORING

CROSS-REFERENCE TO RELATED APPLICATION

This application claims the benefit of priority under 35 U.S.C. § 120 as a continuation of International Patent Application No PCT/CN2021/072055, filed on Jan. 15, 2021, the disclosure of which is incorporated herein by reference in its entirety.

TECHNICAL FIELD

The disclosure relates generally to wireless communications and, more particularly, to a system and method for Physical Downlink Control Channel (PDCCH) monitoring.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). The 5th generation of wireless system is committed to supporting higher data-rates, large number of connections, ultra-low latency, high reliability and other emerging business needs.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one aspect, a method includes receiving, by a wireless communication device (UE 204 in FIG. 2), a high layer signaling including N sets of discontinuous reception (DRX) parameters. In some embodiments, the N is an integer greater than or equal to 1. In some embodiments, the method includes performing, by the wireless communication device, at least one of the following behaviors when a predefined condition is satisfied: changing a physical downlink control channel (PDCCH) monitoring behavior; determining at least one set of DRX parameters among the N sets of DRX parameters, or monitoring the PDCCH during an active time that is determined according to the set of DRX parameters.

In another aspect, a method includes transmitting, by a wireless communication node (BS 202 in FIG. 2) to a wireless communication device, a high layer signaling including N set of discontinuous reception (DRX) parameters, wherein the N is an integer greater than or equal to 1. In some embodiments, the method includes transmitting, by a wireless communication node to a wireless communication device, a downlink control information during an active time.

In another aspect, a method includes receiving, by a wireless communication device, a high layer signaling including N=1 sets of discontinuous reception (DRX) parameters; performing, by the wireless communication device, the following behaviors when a predefined condition is satisfied: monitoring a physical downlink control channel (PDCCH) during an active time that is determined according to the set of DRX parameters and changing a PDCCH monitoring behavior.

In another aspect, a method includes receiving, by a wireless communication device, a high layer signaling including N>1 sets of discontinuous reception (DRX) parameters; performing, by the wireless communication device, the following behaviors when a predefined condition is satisfied; determining one set of DRX parameters among the N sets of DRX parameters, monitoring a physical downlink control channel (PDCCH) during an active time that is determined according to the set of DRX parameters.

In another aspect, a method includes receiving, by a wireless communication device, a high layer signaling including N>=1 sets of discontinuous reception (DRX) parameters; performing, by the wireless communication device, the following behaviors when a predefined condition is satisfied; determining one set of DRX parameters among the N sets of DRX parameters according to a changing factor, monitoring a physical downlink control channel (PDCCH) during an active time that is determined according to the set of DRX parameters.

In another aspect, a method includes receiving, by a wireless communication device, a high layer signaling including N>1 sets of discontinuous reception (DRX) parameters; performing, by the wireless communication device, the following behaviors when a predefined condition is satisfied; determining one set of DRX parameters among the N sets of DRX parameters, monitoring a physical downlink control channel (PDCCH) during an active time that is determined according to the set of DRX parameters, and performing, by the wireless communication device, the following behaviors when another predefined condition is satisfied; changing a PDCCH monitoring behavior.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 9 is a flow diagram depicting a method for PDCCH monitoring, in accordance with some embodiments of the present disclosure.

DETAILED DESCRIPTION OF EXEMPLARY EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
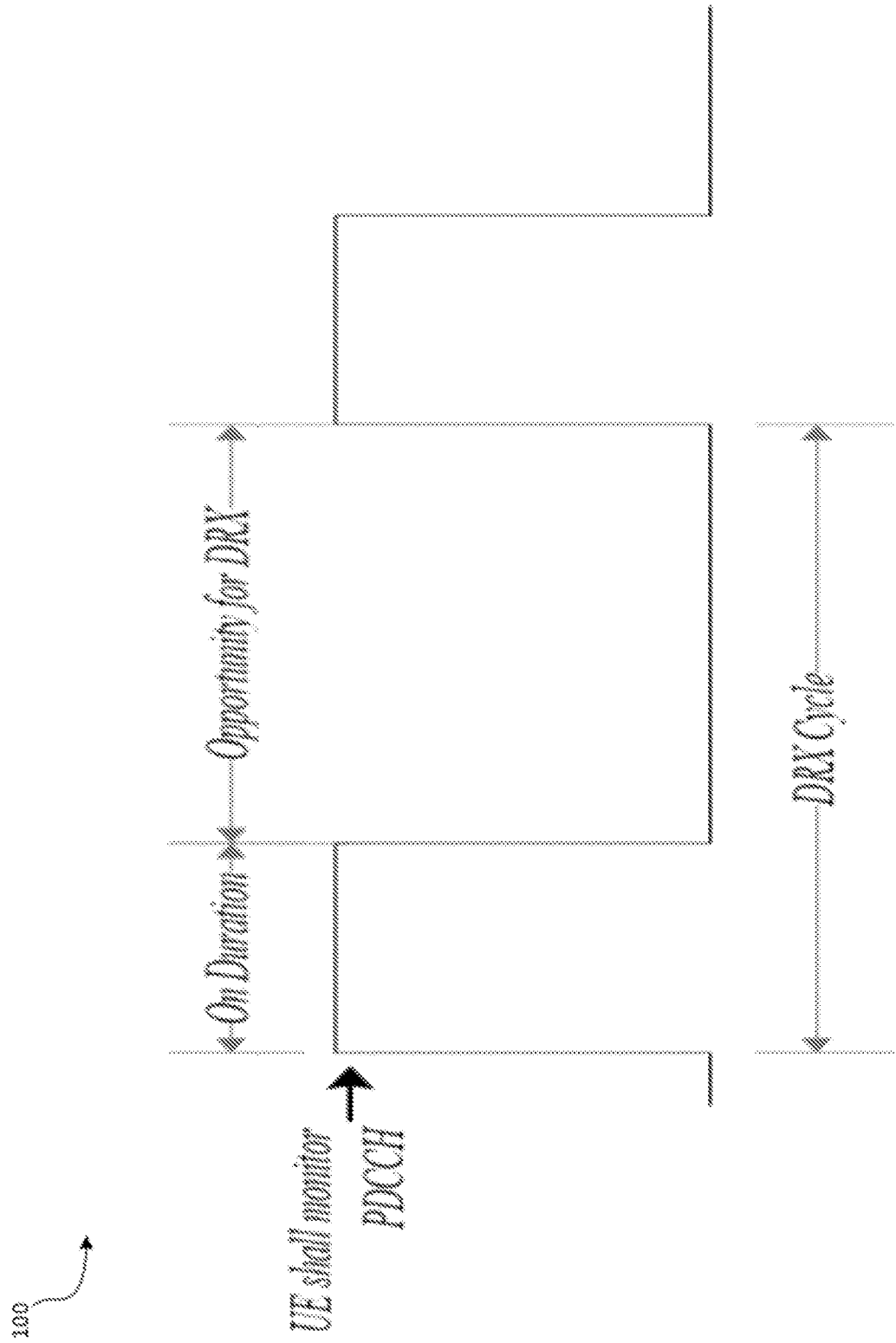
FIG. 1 is a timing diagram depicting an example mechanism of a DRX, in accordance with an embodiment of the present disclosure.

In Long-Term Evolution (LTE), Discontinuous Reception (DRX) may be used for saving power of terminals—e.g., user equipment (UEs). For example, FIG. 1 is a timing diagram 100 depicting an example mechanism of a DRX, in accordance with an embodiment of the present disclosure. In some embodiments, a DRX cycle is configured for a UE (e.g., UE 204 in FIG. 2) and the DRX cycle begins when a timer (e.g., drx-ondurationTimer) starts. In some embodiments, before the timer drx-ondurationTimer expires (e.g., during the timer drx-ondurationTimer), the UE is in a "DRX On" state (sometimes referred as, "active time") and continues monitoring (e.g., detecting, tracking, tracing) one or more Physical Downlink Control Channels (PDCCH). In some embodiments, if the UE successfully decodes (e.g., determines, translates, interprets) a PDCCH or a downlink control information (DCI) in the "DRX On" state, the UE stays awake (sometimes referred to as, "DRX On" state) and starts (e.g., triggers, activates, initiates) a timer drx-inactivityTimer (e.g., inactivity). In some embodiments, the UE may go to sleep (sometimes referred to as, "DRX off" state) after drx-ondurationTimer and/or drx-inactivity Timer expires. In some embodiments, in the "DRX off" state the UE does not monitor some of a PDCCH to save power.

In some embodiments, the "DRX On" state corresponds to (or includes) the time when the timer drx-onDurationTimer and/or drx-Inactivity Timer is running. In some embodiments, the "DRX On" state corresponds to an active time. In some embodiments, when a DRX cycle is configured the active time includes the time while: (1) timer drx-onDurationTimer or drx-InactivityTimer configured for the DRX group is running; (2) timer drx-RetransmissionTimerDL or drx-RetransmissionTimerUL is running on any Serving Cell in the DRX group; (3) timer ra-ContentionResolutionTimer or msgB-ResponseWindow is running; (4) a scheduling request is sent on physical uplink control channel (PUCCH) and is pending; (5) a PDCCH indicating a new transmission addressed to the a cell-radio network temporary identifier (C-RNTI) of a Media Access Control (MAC) entity has not been received after successful reception of a random access response for the random access preamble not selected by the MAC entity among the contention-based random access preamble.

In some embodiments, a Radio Resource Control (RRC) controls DRX operation by configuring one or more of the following parameters: (1) drx-onDurationTimer: the duration at the beginning of a DRX cycle; (2) drx-SlotOffset: the delay before starting the drx-onDurationTimer; (3) drx-InactivityTimer: the duration after the PDCCH occasion in which a PDCCH indicates a new uplink (UL) or downlink (DL) transmission for the MAC entity; (4) drx-RetransmissionTimerDL (per DL hybrid automatic repeat request (HARD) process except for the broadcast process): the maximum duration until a DL retransmission is received; (5) drx-RetransmissionTimerUL (per UL HARQ process): the maximum duration until a grant for UL retransmission is received; (6) drx-LongCycleStartOffset: the Long DRX cycle and drx-StartOffset which defines the subframe where the Long and Short DRX cycle starts; (7) drx-ShortCycle (optional): the Short DRX cycle; (8) drx-ShortCycleTimer (optional): the duration the UE shall follow the Short DRX cycle; (9) drx-HARQ-RTT-TimerDL (per DL HARQ process except for the broadcast process): the minimum duration before a DL assignment for HARQ retransmission is expected by the MAC entity; (10) drx-HARQ-RTT-TimerUL (per UL HARQ process): the minimum duration before a UL HARQ retransmission grant is expected by the MAC entity; (11) ps-Wakeup (optional): the configuration to start associated drx-onDurationTimer in case DCI with Cyclic Redundancy Check (CRC) scrambled by power saving (PS)-Radio Network Temporary Identifier (RNTI) is monitored but not detected; (12) ps-TransmitOtherPeriodicCSI (optional): the configuration to report periodic Channel Status Indicator (CSI) that is not Layer1-Reference Signal Received Power (L1-RSRP) on a Physical Uplink Control Channel (PUCCH) during the time duration indicated by drx-onDurationTimer in case DCP is configured but associated drx-onDurationTimer is not started; or (13) ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started. DCP is DCI with CRC scrambled by PS-RNTI.

In Next Generation Radio Access Network (NR), more power saving techniques are proposed, for example, DCI format 2_6 may be used for notifying the power saving information outside DRX active Time for one or more UEs; a field in DCI format 0_1 and 1_1 may be used to indicate minimum applicable scheduling offset (cross slot scheduling), and/or DCI format 0_1 or 1_1 or 2_6 may be used to indicate a Secondary Cell (SCell) dormancy.

In 5th Generation Mobile Networks NR-Unlicensed (5G NR-U), the search space set group switching functionality is specified to be supported by the UE. The search space set group switching may be triggered by the DCI format 2-0 and/or the timer with the value configured by the high layer parameter searchSpaceSwitchingTimer-r16. The UE can be provided a group index for a respective search space set by searchSpaceGroupIdList-r16 for PDCCH monitoring on a serving cell. If the UE is provided searchSpaceSwitching-GroupList-r16, indicating one or more groups of serving cells, the search space set group switching procedures apply to all serving cells within each group; otherwise, the search space set group switching procedures apply only to a serving cell for which the UE is provided searchSpaceGroupIdList-r16.

Cross slot scheduling: in New Radio (NR) release-16, high layer signaling minimumSchedulingOffsetK0 can configure one or two minimum K0(k0 min) value. In some embodiments, if the high layer signaling is configured, a minimum applicable scheduling offset indicator field in Downlink Control Information (DCI) format 1_1 bitwidth is 1 bit, otherwise, the bitwidth is 0 bit. In some embodiments, high layer signaling minimumSchedulingOffsetK2 can configure one or two minimum K2(k2 min) value. In some embodiments, if the high layer signaling is configured, a minimum applicable scheduling offset indicator field in DCI format 0_1 bitwidth is 1 bit, otherwise, the bitwidth is 0 bit. In some embodiments, the field in DCI format 0_1 or DCI format 1_1 is used to determine (or indicate) a minimum K0 (sometimes referred to as, "K0 min") or a minimum K2 (sometimes referred to as, "K2 min"). In some embodiments, if K0 min is greater than 0, a scheduled Physical Downlink Shared Channel (PDSCH) scheduled by a DCI and the DCI does not received in one slot, so User Equipment (UE) can relax processing time to save power. In some embodiments, if K2 min is greater than 0, a scheduled Physical Uplink Shared Channel (PUSCH) scheduled by a DCI and the DCI does not received in one slot.

In some embodiments, K0 min: minimum Slot offset between DCI and its scheduled Physical Downlink Shared Channel (PDSCH). In some embodiments, K2 min is a minimum Slot offset between DCI and its scheduled Physical Uplink Shared Channel (PUSCH). In some embodiments, K0 is a slot offset between DCI and its scheduled Physical Downlink Shared Channel (PDSCH). In some embodiments, K2 is a slot offset between DCI and its scheduled Physical Uplink Shared Channel (PUSCH).

In the conventional system, when DRX is configured the UE monitors PDCCH during active time, where the active time may be related to one or more (e.g., a set, a plurality, a group) DRX parameters.

The present disclosure, however, provides enhancements to the conventional system by providing mechanisms for changing one or more DRX parameters or PDCCH monitoring behavior.

1. Mobile Communication Technology and Environment

Figure 2:
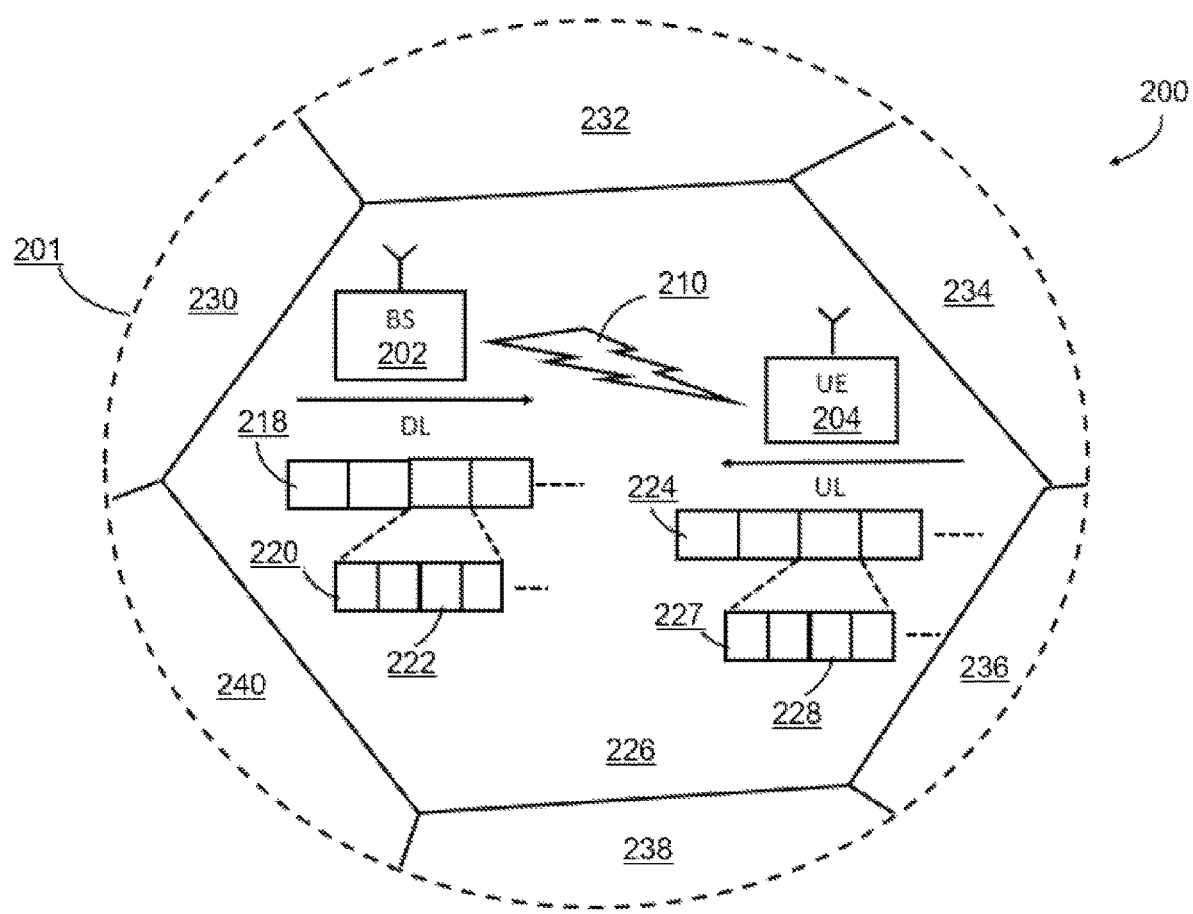
FIG. 2 illustrates an example cellular communication network in which techniques disclosed herein may be implemented, in accordance with an embodiment of the present disclosure.

FIG. 2 illustrates an example wireless communication network, and/or system, 200 in which techniques disclosed herein may be implemented, in accordance with an embodiment of the present disclosure. In the following discussion, the wireless communication network 200 may be any wireless network, such as a cellular network or a narrowband Internet of things (NB-IoT) network and is herein referred to as "network 200." Such an example network 200 includes a base station 202 (hereinafter "BS 202"; also referred to as wireless communication node) and a user equipment device 204 (hereinafter "UE 204"; also referred to as wireless communication device) that can communicate with each other via a communication link 210 (e.g., a wireless communication channel), and a cluster of cells 226, 230, 232, 234, 236, 238 and 240 overlaying a geographical area 201. In FIG. 2, the BS 202 and UE 204 are contained within a respective geographic boundary of cell 226. Each of the other cells 230, 232, 234, 236, 238 and 240 may include at least one base station operating at its allocated bandwidth to provide adequate radio coverage to its intended users.

For example, the BS 202 may operate at an allocated channel transmission bandwidth to provide adequate coverage to the UE 204. The BS 202 and the UE 204 may communicate via a downlink radio frame 218, and an uplink radio frame 224 respectively. Each radio frame 218/224 may be further divided into sub-frames 220/227 which may include data symbols 222/228. In the present disclosure, the BS 202 and UE 204 are described herein as non-limiting examples of "communication nodes," generally, which can practice the methods disclosed herein. Such communication nodes may be capable of wireless and/or wired communications, in accordance with various embodiments of the present solution.

Figure 3:
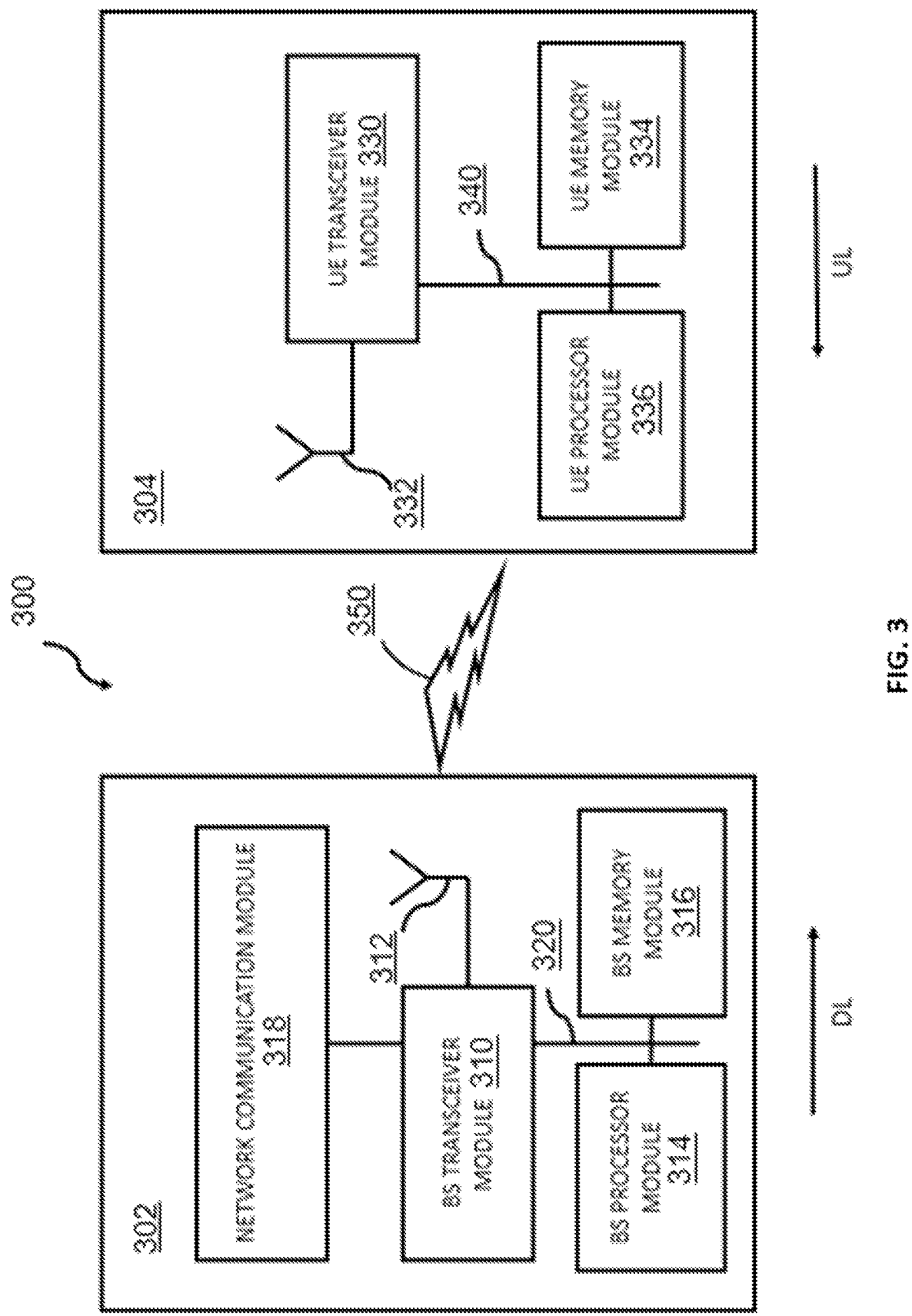
FIG. 3 illustrates block diagrams of an example base station and a user equipment device, in accordance with some embodiments of the present disclosure.

FIG. 3 illustrates a block diagram of an example wireless communication system 300 for transmitting and receiving wireless communication signals (e.g., Orthogonal Frequency-Division Multiplexing/Orthogonal Frequency-Division Multiple Access (OFDM/OFDMA signals)) in accordance with some embodiments of the present solution. The system 300 may include components and elements configured to support known or conventional operating features that need not be described in detail herein. In one illustrative embodiment, system 300 can be used to communicate (e.g., transmit and receive) data symbols in a wireless communication environment such as the wireless communication environment 300 of FIG. 3, as described above.

System 300 generally includes a base station 302 (hereinafter "BS 302") and a user equipment device 304 (hereinafter "UE 304"). The BS 302 includes a BS (base station) transceiver module 310, a BS antenna 312, a BS processor module 314, a BS memory module 316, and a network communication module 318, each module being coupled and interconnected with one another as necessary via a data communication bus 320. The UE 304 includes a UE (user equipment) transceiver module 330, a UE antenna 332, a UE memory module 334, and a UE processor module 336, each module being coupled and interconnected with one another as necessary via a data communication bus 340. The BS 302 communicates with the UE 304 via a communication channel 350, which can be any wireless channel or other medium suitable for transmission of data as described herein.

As would be understood by persons of ordinary skill in the art, system 300 may further include any number of modules other than the modules shown in FIG. 3. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 330 may be referred to herein as an "uplink" transceiver 330 that includes a radio frequency (RF) transmitter and a RF receiver each comprising circuitry that is coupled to the antenna 332. A duplex switch (not shown) may alternatively couple the uplink transmitter or receiver to the uplink antenna in time duplex fashion. Similarly, in accordance with some embodiments, the BS transceiver 310 may be referred to herein as a "downlink" transceiver 310 that includes a RF transmitter and a RF receiver each comprising circuitry that is coupled to the antenna 312. A downlink duplex switch may alternatively couple the downlink transmitter or receiver to the downlink antenna 312 in time duplex fashion. The operations of the two transceiver modules 310 and 330 may be coordinated in time such that the uplink receiver circuitry is coupled to the uplink antenna 332 for reception of transmissions over the wireless transmission link 350 at the same time that the downlink transmitter is coupled to the downlink antenna 312. Conversely, the operations of the two transceivers 310 and 330 may be coordinated in time such that the downlink receiver is coupled to the downlink antenna 312 for reception of transmissions over the wireless transmission link 350 at the same time that the uplink transmitter is coupled to the uplink antenna 332. In some embodiments, there is close time synchronization with a minimal guard time between changes in duplex direction.

The UE transceiver 330 and the base station transceiver 310 are configured to communicate via the wireless data communication link 350 and cooperate with a suitably configured RF antenna arrangement 312/332 that can support a particular wireless communication protocol and modulation scheme. In some illustrative embodiments, the UE transceiver 330 and the base station transceiver 310 are configured to support industry standards such as the Long-Term Evolution (LTE) and emerging 5G standards, and the like. It is understood, however, that the present disclosure is not necessarily limited in application to a particular standard and associated protocols. Rather, the UE transceiver 330 and the base station transceiver 310 may be configured to support alternate, or additional, wireless data communication protocols, including future standards or variations thereof.

In accordance with various embodiments, the BS 302 may be an evolved node B (eNB), a serving eNB, a target eNB, a femto station, a gNodeB (gNB) or a pico station, for example. In some embodiments, the UE 304 may be embodied in various types of user devices such as a mobile phone, a smart phone, a personal digital assistant (PDA), tablet, laptop computer, wearable computing device, etc. The processor modules 314 and 336 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 314 and 336, respectively, or in any practical combination thereof. The memory modules 316 and 334 may be realized as RAM memory, flash memory, ROM memory, EPROM memory, EEPROM memory, registers, a hard disk, a removable disk, a CD-ROM, or any other form of storage medium known in the art. In this regard, memory modules 316 and 334 may be coupled to the processor modules 314 and 336, respectively, such that the processors modules 314 and 336 can read information from, and write information to, memory modules 316 and 334, respectively. The memory modules 316 and 334 may also be integrated into their respective processor modules 314 and 336. In some embodiments, the memory modules 316 and 334 may each include a cache memory for storing temporary variables or other intermediate information during execution of instructions to be executed by processor modules 314 and 336, respectively. Memory modules 316 and 334 may also each include non-volatile memory for storing instructions to be executed by the processor modules 314 and 336, respectively.

The network communication module 318 generally represents the hardware, software, firmware, processing logic, and/or other components of the base station 302 that enable bi-directional communication between base station transceiver 310 and other network components and communication nodes configured to communication with the base station 302. For example, network communication module 318 may be configured to support internet or WiMAX traffic. In a typical deployment, without limitation, network communication module 318 provides an 802.3 Ethernet interface such that base station transceiver 310 can communicate with a conventional Ethernet based computer network. In this manner, the network communication module 318 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non-Access Stratum (NAS) layer or an Internet Protocol (IP) layer, and the seventh layer being the other layer.

2. PDCCH Monitoring

In some embodiments, a UE (e.g., UE 204 in FIG. 2) may receive a high layer signaling. In some embodiments, the high layer signaling may include one or more (e.g., a set) DRX parameters. In some embodiments, the high layer signaling may include one or more set of DRX parameters. In some embodiments, the UE may monitor (e.g., detect, track, trace) a PDCCH during an active time. In some embodiments, the active time is determined by the one or more DRX parameters. In some embodiments, the UE may change (e.g., modify, increase, decrease, adjust) the one or more DRX parameters when a first predefined condition (sometimes referred to as, "first condition", or "predefined condition") is satisfied. In some embodiments, the UE may change the one or more DRX parameters during the active time when a first condition is satisfied. In some embodiments, the first predefined condition is associated with at least one of a downlink control information (DCI), high layer signaling, a downlink (DL) assignment, an uplink (UL) grant, a physical downlink shared channel (PDSCH), a transport block, an ACK/NACK, a DRX parameter, a semi-persistent scheduling (SPS) configuration, WUS, a timer, a radio network temporary identifier (RNTI), a capability of the UE, or assistance information of the UE. In some embodiments, high layer signaling include MAC CE or RRC signaling.

3. Increase a Second Active Time, Start a Second Active Time, or Change a PDCCH Monitoring Behavior In some embodiments, the UE may change (e.g., modify, increase, decrease, adjust) PDCCH monitoring behavior. In some embodiments, changing PDCCH monitoring behavior means monitoring a PDCCH during a second active time when the predefined condition is satisfied. In some embodiments, changing PDCCH monitoring behavior means starting a timer in a DRX off state when the predefined condition is satisfied. In some embodiments, changing PDCCH monitoring behavior means changing from not monitoring PDCCH to monitoring PDCCH when the predefined condition is satisfied. In some embodiments, changing PDCCH monitoring behavior means changing from DRX off state to DRX on state when the predefined condition is satisfied. In some embodiments, the DRX off state is time when drx-onDurationTimer and drx-inactivityTimer are not running. In some embodiments, the DRX off state include at least one of the following time: (1) drx-onDurationTimer and drx-inactivityTimer are not running; (2) a time excluding the active time; (3) timer drx-RetransmissionTimerDL or drx-RetransmissionTimerUL is not running on any Serving Cell in the DRX group; or (4) timer ra-ContentionResolutionTimer or msgB-ResponseWindow is not running. In some embodiments, UE does not monitor the PDCCH in DRX off state. In some embodiments, a second active time does not start at active time. In some embodiments, a second active time starts in DRX off state.

In some embodiments, two DRX groups are configured. In some embodiments, UE determines two sets of DRX parameters used for different DRX group. In some embodiments, UE determines more than one sets of DRX parameters and these sets of DRX parameters are used at the same time.

Figure 4:
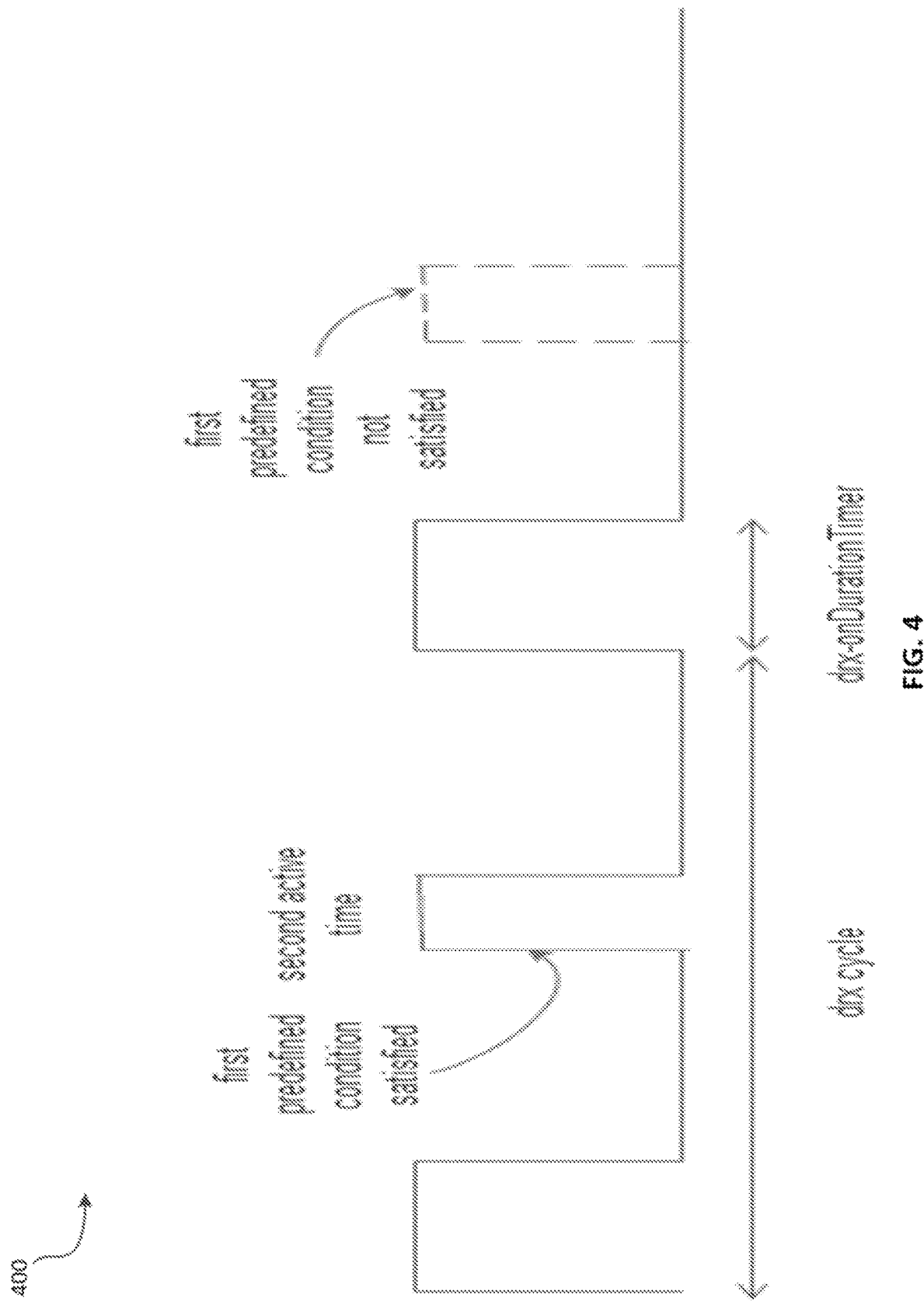
FIG. 4 is a timing diagram depicting an example mechanism for increasing a second active time, in accordance with an embodiment of the present disclosure.

In some embodiments, the UE may increase a second active time (e.g., Wake Up at DRX off). In some embodiments, high layer signaling includes one or more sets of DRX parameters. For example, FIG. 4 is a timing diagram 400 depicting an example mechanism for increasing a second active time, in accordance with an embodiment of the present disclosure. In some embodiments, a UE starts (e.g., triggers, initiates) a second active time when a first predefined condition is satisfied (e.g., met, achieved, resolved) during one or more DRX cycles. In some embodiments, a UE starts (e.g., triggers, initiates) a second active time when a first predefined condition is satisfied (e.g., met, achieved, resolved) during DRX is configured. In some embodiments, in a first DRX cycle, a UE starts a second active time when a first predefined condition satisfied. In some embodiments, during a second DRX cycle the UE does not start a second active time because a first predefined condition is not satisfied. In some embodiments, a UE starts a second active time by monitoring a PDCCH during the second active time (i.e., a UE wake-ups at "DRX-off").

3.1 An Indication or Configuration of Second Active Time

In some embodiments, one or more second active time parameters are indicated by at least one of the following: a DCI, or a high layer signaling.

In some embodiments, second active time is associated with and/or determined by at least one of the following parameters: a start time, a duration, a period, a time value, a timer, or an offset. In some embodiments, a start time indicates when to start the second active time. In some embodiments, a duration indicates the length of the second active time. In some embodiments, a period indicates the period of second active time. In some embodiments, a time value corresponds to a time value of the second active time period. In some embodiments, an offset is a time duration between the start of second active time and a reference point. In some embodiments, the unit of second active time parameters is a millisecond, a slot, a subframe, or a frame.

In some embodiments, a start time of a second active time is determined by and/or associate with at least one of the following: a high layer signaling, a DCI, a PDSCH, a first timer, an N1, an N2, a k1, a k2, a k0, a minimum k0, a minimum k2, an SCS, a long DRX cycle, a short DRX cycle, a bandwidth part (BWP), or a DRX start offset, a drx-SlotOffset.

In some embodiments, a duration of a second active time is determined by and/or associated with at least one of the following: a high layer signaling, a DCI, a PDSCH, a second timer, an N1, an N2, a k1, a k2, a k0, a minimum k0, a minimum k2, an SCS, a long DRX cycle, a short DRX cycle, a BWP, a DRX start offset, or a drx-SlotOffset.

In some embodiments, a second active time is associated with a duration determined by a second timer. The second timer is the duration of a second active time. If the timer is expired, then the second active time is stopped. In some embodiments, a second active time is associated with a timer. The timer is the duration of second active time. If the timer is expired, then the second active time is stopped. In some embodiments, an active time includes a time when a second timer or a timer is running. In some embodiments, an active time includes a time for a second active time.

In some embodiments, the second active time parameters are associated with an offset. In some embodiments, an offset is a time duration between the start of a second active time and a reference point.

In some embodiments, the reference point is associated with at least one of the following: a drx-onDurationTimer, a drx-inactivityTimer, a subframe index, a system frame number (SFN), a SCS, or a signaling. In some embodiments, the reference point is associated with at least a drx-onDuration-Timer. For example, the reference point is the last slot/ms before the drx-onDurationTimer expires.

In some embodiments, the reference point is associated with at least a drx-inactivityTimer. For example, the reference point is the last slot/ms before the drx-inactivityTimerexpire.

In some embodiments, the reference point is associated with at least a signaling. For example, the reference point is the last slot/ms when receiving the signaling. In some embodiments, the signaling indicates to start a second active time. In some embodiments, unit of second active time parameters is milliseconds or slots.

In some embodiments, the reference point is associated with at least a subframe index. For example, the reference point is the subframe 0 in a frame.

In some embodiments, the reference point is associated with at least an SFN and a signaling. For example, the reference point is the first subframe in the SFN which is the next frame after receiving the signaling.

In some embodiments, second active time parameters are indicated by a high layer signaling. In some embodiments, the high layer signaling corresponds to (or includes) DRX parameters for other UEs. In some embodiments, the high layer signaling indication corresponds to at least a start time, a duration, a timer or a period of a second active time.

In some embodiments, second active time parameters are indicated by a DCI. In some embodiments, RRC signaling may include one or more second active time parameters, where a DCI is used to indicate one of the second active time parameters.

In some embodiments, second active time parameters are indicated by a DCI according to a bitmap. For example, a DCI indicates a bitmap '0001111', which means a second active time is started after 3 slots after the DCI and/or the duration of the second active time is 4 slots.

In some embodiments, a second active time parameter includes a period. In some embodiments, a UE starts a second active time every period. In some embodiments, a second active time parameter includes a period and/or a time value (T). In some embodiments, a UE starts second active time every period time for T times. In some embodiments, a UE stops a second active time when drx-onDurationTimer start and/or restart.

In some embodiments, the first timer and/or second timer and/or the timer may include at least one of the following: an offset timer, a drx-onDurationTimer, a drx-Inactivity Timer, a drx-HARQ-RTT-TimerDL, a drx-HARQ-RTT-TimerUL, a drx-RetransmissionTimerDL, a drx-RetransmissionTimerUL, or a BWP inactivity timer. In some embodiments, a start time of a second active time is determined by and/or associated with at least a first timer. In some embodiments, the first timer starts and/or restarts when a drx-onDurationTimer or a drx-InactivityTimer expires and/or a predetermined condition is satisfied. In some embodiments, the first timer is the duration after a drx-onDurationTimer or a drx-Inactivity Timer expires and/or before a second active time. In some embodiments, the first timer value is indicated by a DCI, a MAC CE, a PDSCH, and/or an RRC signaling.

In some embodiments, a second active time is associated with a location of short DRX parameters. In some embodiments, short DRX parameters include at least one of the following: a drx-ShortCycle, or drx-ShortCycleTimer.

In some embodiments, at least one of the following first parameters are different between a second active time and/or an active time: a Search space set group, a minimum k0/k2, skipping duration, a CORESET, a valid RNTI to monitor, a drx-retransmissionTimer, and/or drx-inactivityTimer.

In some embodiments, the search space set group in a second active time is different from search space set group in an active time. For example, the period configured in search space set used in a second active time is greater than the period configured in search space set used in an active time.

In some embodiments, the minimum k0/k2 in second active time is different from minimum k0/k2 in active time. For example, the minimum k0/k2 in a second active time is larger than the minimum k0/k2 in an active time.

In some embodiments, the RNTI to be monitored in a second active time is different from the RNTI to be monitored in an active time. For example, a UE can monitor cell radio network temporary identifier (C-RNTI), modulation coding scheme (MCS)-C-RNTI, Cancellation indication (CI)-RNTI, configured scheduling (CS)-RNTI, interruption (INT)-RNTI, slot format indication (SFI)-RNTI, persistent channel state information (SP-CSI)-RNTI, transmit power control (TPC)-PUCCH-RNTI, TPC-PUSCH-RNTI, transmit power control sounding reference symbols (TPC-SRS)-RNTI, and/or availability indicator (AI)-RNTI in an active time; and the UE can monitor C-RNTI, MCS-C-RNTI, and/or CS-RNTI in a second active time.

In some embodiments, UE does not expect to configure and/or indicated both a second active time and a short DRX.

3.2 First Predefined Condition

In some embodiments, a first predefined condition is associated with at least a DL assignment or an UL grant or a DRX parameter. For example, first predefined condition is satisfied when UE does not receive a DL assignment or a UL grant before drx-onDurationTimer expiring. In some embodiments, a first predefined condition is associated with at least a DCI or a high layer signaling or a PDSCH. For example, a first predefined condition is satisfied when receiving a DCI or high layer signaling or a PDSCH or an L1 signaling. In some embodiments, the DCI or a high layer signaling or a PDSCH may indicate at least one of the following: a start second active time indication, a second active time parameter indication, a change DRX parameters indication, or a DRX parameters indication, or change PDCCH monitoring behavior indication. In some embodiments, a first predefined condition is associated with at least an ACK/NACK. As example, a first predefined condition is satisfied when UE sends a NACK in and/or during the DRX cycle. In some embodiments, a first predefined condition is associated with at least a DRX parameter. As example, a first predefined condition is satisfied when UE starts a drx-onDurationTimer. As another example, a first predefined condition is satisfied when Drx-inactivityTimer expires. As another example, a first predefined condition is satisfied when Drx-onDurationTimer expires. In some embodiments, a first predefined condition is associated with at least a capability of UE. For example, a first predefined condition is satisfied when UE capability supports a second active time.

3.3 Group 'A' Embodiment(s)

In some embodiments, a UE receives a high layer signaling. In some embodiments, the high layer signaling includes one or more sets of DRX parameters. In some embodiments, UE monitors PDCCH on a second active time when a first condition satisfied. In some embodiments, first predefined condition includes at least receiving a signaling indicate to start a second active time. In some embodiments, the signaling is a DCI. In some embodiments, a first predefined condition includes at least receiving a DCI indicate to start a second active time. In some embodiments, the DCI is scrambled with PS (power saving)-RNTI. In some embodiments, a UE starts a second active time by monitoring PDCCH on (or during) a second active time.

In some embodiments, a second active time is determined to include at least a duration. In some embodiments, the duration is associated with drx-onDurationTimer. In some embodiments, UE starts drx-onDurationTimer at the start time of a second active time. In some embodiments, the duration is associated with a second timer. In some embodiments, UE starts the second timer at the start time of a second active time and/or monitoring PDCCH before the second timer expires.

In some embodiments, a second active time starts right after the slot in which UE detects the DCI. In some embodiments, the start time of second active time is configured and/or indicated by RRC signaling.

4. Change DRX Parameters or Determine at Least One Set of DRX Parameters

In some embodiments, UE receives a high layer signaling. In some embodiments, the high layer signaling include N sets of DRX parameters. In some embodiments, the number of DRX parameters in a different set of DRX parameters can be different or same. For example, one set of DRX parameters is only configured with drx-startOffset, and the other set of DRX parameters is configured with all DRX parameters. In some embodiments, at least one of the following are different associate with different set of DRX parameters: search space set group, CORESET, minimum k0/k2, skipping duration.

In some embodiments, UE determines and/or changes (e.g., resets, modifies, adjusts) one or more sets of DRX parameters among the N sets of DRX parameters when a first predefined condition is satisfied. In some embodiments, the UE determines and/or changes one or more sets of DRX parameters among the N sets of DRX parameters according to at least one of high layer signaling and a first predefined condition. In some embodiments, UE determines at least one set of DRX parameters among the N sets of DRX parameters means using an indicated set of DRX parameters which is indicated by a DCI or MAC CE when the predefined condition is satisfied. In some embodiments, UE determines at least one set of DRX parameters among the N sets of DRX parameters means using a default set of DRX parameters when the predefined condition is satisfied. In some embodiments, UE determines at least one set of DRX parameters among the N sets of DRX parameters means changing one of more DRX parameters in a set of DRX parameters according to the one or more changing factors or the one or more changing periods. In some embodiments, UE determines at least one set of DRX parameters among the N sets of DRX parameters means changing set of DRX parameters according to the one or more changing factors or the one or more changing periods. In some embodiments, a first predefined condition is associated with at least a DCI or a high layer signaling or a PDSCH. For example, a first predefined condition is satisfied when receiving a DCI, a high layer signaling, a PDSCH, or an L1 signaling.

In some embodiments, high layer signaling includes at least one of the following: one or more set of DRX parameters; an enable/disable change of one or more DRX parameters; changing factor(s) of one or more DRX parameters; changing delay of one or more DRX parameters; or changing period of one or more DRX parameters.

In some embodiments, a changing factor is a factor used to modify one or more DRX parameters. In some embodiments, a changing delay is duration between UE starts changing DRX parameters and finishes changing DRX parameters. In some embodiments, a changing delay is the duration between when the first condition is satisfied and when the UE finishes changing one or more DRX parameters. In some embodiments, a changing period is duration before the UE changing one or more DRX parameters. In some embodiments, UE finishes changing one or more DRX parameters after a changing delay.

In some embodiments, if high layer signaling configured one or more sets of DRX parameters, UE uses a default set of DRX parameters after receiving the signaling. In some embodiments, the default set of DRX parameters is the lowest index of the set of DRX parameters. In some embodiments, the default set of DRX parameters is indicated by high layer signaling.

In some embodiments, if several sets of DRX parameters have different number of DRX parameters, then the un-configured DRX parameters in a set of DRX parameters are same as the DRX parameters configured in default set of DRX parameters. For example, if a second set of DRX parameters only has drx-inactivityTimer parameter, then the other DRX parameters (e.g., un-configured) are the same as the first set of DRX parameters. In some embodiments, if several sets of DRX parameters have different number of DRX parameters, then the un-configured DRX parameters in a set of DRX parameters are the same as the DRX parameters configured in another set of DRX parameters which are configured with the other DRX parameters.

4.1 First Predefined Condition and/or Parameters

In some embodiments, a first predefined condition is associated with at least a DCI, a high layer signaling, or a PDSCH. For example, a first predefined condition is satisfied when receiving a DCI, a high layer signaling, a PDSCH or an L1 signaling. In some embodiments, a first predefined condition is associated with a timer. For example, a first predefined condition is satisfied when the timer expires.

In some embodiments, a DCI, a high layer signaling, a PDSCH, an L1 signaling may indicate at least one of the following: a start second active time indication, a second active time parameter indication, a change DRX parameters indication, or a DRX parameters indication.

4.2 When to Change DRX Parameters

In some embodiments, UE changes one or more DRX parameters when the first predefined condition is satisfied after at least one of the following occasions: the last symbol/slot/ms satisfied the first predefined condition, the last symbol/slot/ms receives the first signaling; UE sends an ACK for the indication or a data corresponding to the DCI; a number of symbols/slots after UE sending an ACK for the indication or a data corresponding to the DCI or high layer signaling; a Drx-inactivityTimer expire; a Drx-onDurationTimer expire; or a changing delay.

In some embodiments, the start of the delay is one of the following: a next symbol or a slot when first predefined condition is satisfied, or a reference point. In some embodiments, the reference point associate with at least one of the following: an SCS, an SFN, a subframe, a frame. In some embodiments, the units of the delay may be ms or a slot or a symbol or a subframe, or frame.

In some embodiments, UE changes the set of DRX parameters or the PDCCH monitoring behavior after at least one of: a last symbol or a slot when first predefined condition is satisfied; the last symbol or the last slot when the high layer signaling is received; sending, by the wireless communication device, an acknowledgement (ACK) responsive to receiving an indication signaling; sending, by the wireless communication device, an uplink (UL) signal responsive to receiving an indication signaling; an expiration of a drx-retransmissionTimer; an expiration of a drx-InactivityTimer; or a delay.

In some embodiments, the indication signaling is a DCI or a PDSCH or a high layer signaling. In some embodiments, a predefined condition corresponds to receiving an indication signaling (e.g., a DCI, a PDSCH, or a high layer signaling). The indication signaling may carry indication information about a second active time parameters or starting a second active time indication or changing PDCCH monitoring behavior indication or changing one or more DRX parameters indication. In some embodiments, the indication signaling may be a signaling only carry the indication information. In some embodiments, UE will send an ACK/NACK for the indication information. In some embodiments, the indication signaling carries a DL assignment or UL grant. In some embodiments, UE will send an ACK/NACK for whether successfully decode/transmit the data.

In some embodiments, UE changes the set of DRX parameters or the PDCCH monitoring behavior after an acknowledgement (ACK) responsive to receiving an indication signaling. For example, the indication signaling is a DCI. The changing DRX parameters indication is indicated by a DCI which also indicate a data scheduling, then the UE changes one or more DRX parameters after UE sends an ACK for the data scheduled by the DCI.

In some embodiments, UE changes the set of DRX parameters or the PDCCH monitoring behavior after an acknowledgement (ACK) responsive to receiving an indication signaling. For example, the indication signaling is a DCI. The changing DRX parameters indication is indicated by a DCI without a data scheduling, then the UE changes DRX after N1 symbols/slots after UE sends an ACK for the indication. In some embodiments, N1 is greater than or equal to 1. In some embodiments, N1 is associated with SCS. In some embodiments, UE changes one or more DRX parameters right after the first predefined condition is satisfied.

4.3 Changing DRX Parameters Between More than One Set of DRX Parameters

In some embodiments, the UE may change one or more DRX parameters between at least two sets of DRX parameters.

4.3.1 Group 'B' Embodiment(s)

In some embodiments, high layer signaling includes at least two sets of DRX parameters. Each set of DRX parameters include at least one of the following: drx-onDurationTimer, drx-SlotOffset, drx-InactivityTimer, drx-RetransmissionTimerDL, drx-RetransmissionTimerUL, drx-LongCycleStartOffset, drx-ShortCycle, drx-ShortCycleTimer, drx-HARQ-RTT-TimerDL, drx-HARQ-RTT-TimerUL, ps-Wakeup, ps-TransmitOtherPeriodicCSI, ps-TransmitPeriodicL1-RSRP, drx-startOffset. In some embodiments, the number of DRX parameters in a different set can be different. For example, one set of DRX parameters include all the above DRX parameters and the other set of DRX parameters only include drx-LongCycleStartOffset or drx-startOffset.

In some embodiments, the two set of DRX parameters used to be changed when first predefined condition satisfied is DRX parameters configured by DRX-Config and DRX parameters configured by DRX-ConfigSecondaryGroup. In some embodiments, high layer signaling includes DRX-Config which is used to configure DRX related parameters and/or DRX-ConfigSecondaryGroup which is used to configure DRX related parameters for the second DRX group. In some embodiments, if a second predefined condition satisfied, then the UE can change DRX parameters between the two configurations based on first predefined condition. In some embodiments, a second predefined condition includes at least one of the following: a high layer signaling without a second DRX group or configured without FR2 type or configured with change DRX parameter indication.

In some embodiments, if a first predefined condition satisfied, then one or more DRX groups related to the DRX parameters are changed. In some embodiments, if a first predefined condition is satisfied, then only the DRX group related to the DRX parameters are changed.

In some embodiments, a first predefined condition satisfied when receiving a DCI or a PDSCH or a high layer signaling or an L1 signaling. In some embodiments, the DCI or PDSCH or high layer signaling or L1 signaling indicates a DRX parameter changing indication. In some embodiments, a first predefined condition is satisfied when a timer expires. For example, a changing DRX parameter timer may expire.

In some embodiments, the DCI includes a field used to indicate a DRX parameter changing indication. In some embodiments, the DRX parameter changing indication may include an index of set of DRX parameters. In some embodiments, UE will change one or more DRX parameters to the indicated index of set of DRX parameters after receiving the indication.

Figure 5:
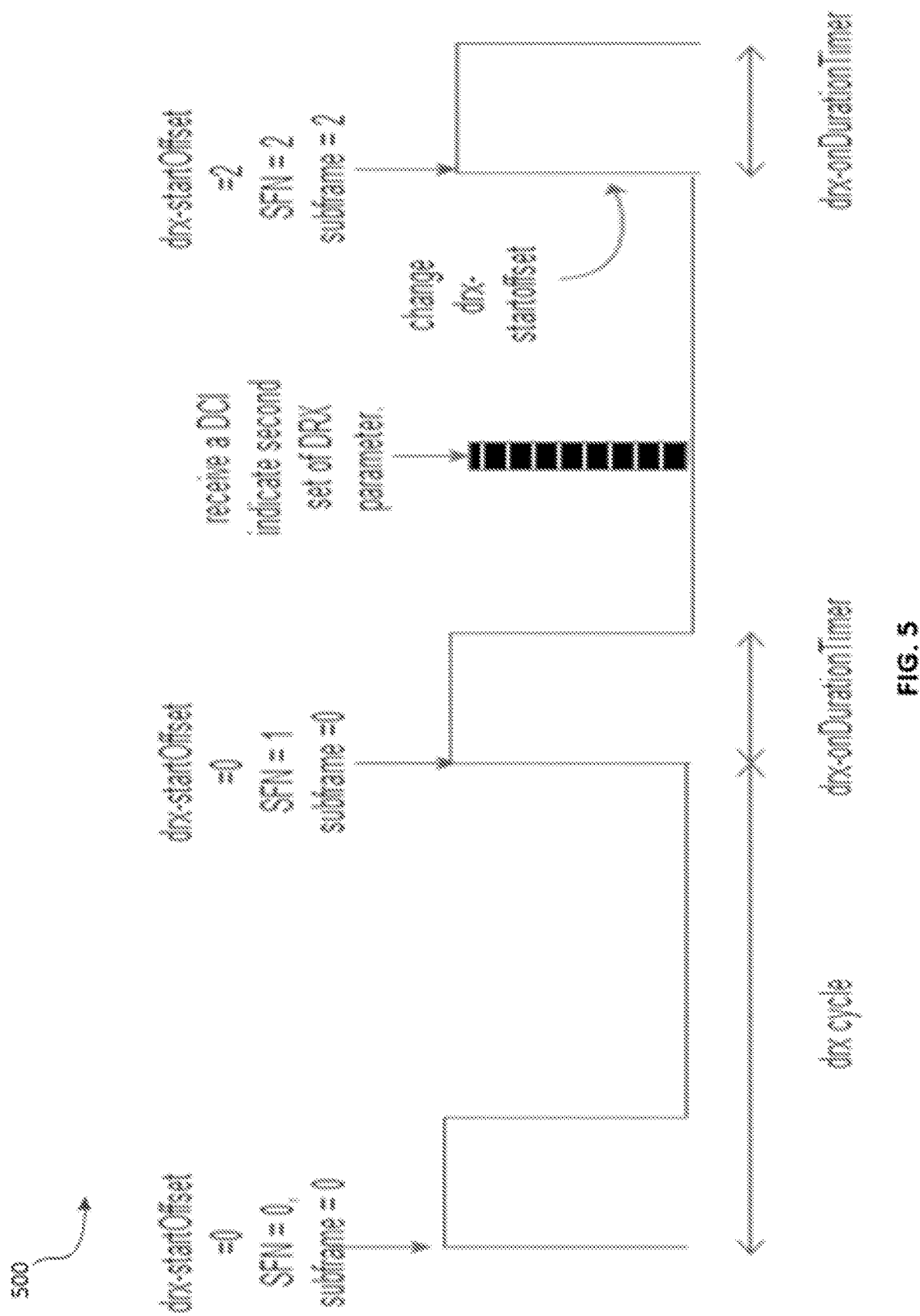
FIG. 5 is a timing diagram depicting an example mechanism for changing DRX parameters, in accordance with an embodiment of the present disclosure.

FIG. 5 is a timing diagram depicting an example mechanism for changing DRX parameters, in accordance with an embodiment of the present disclosure. In some embodiments, one of the DRX parameters (e.g., drx-longcyclestartoffset or drx-startoffset) has two sets of parameters configured by RRC signaling, wherein one set is associated with one index. For example, the first set with index 1 is configured with drx-startoffset=0, and second set with index 2 is configured with drx-startoffset=2. In some embodiments, the other DRX parameters are only configured for one set value such that only drx-startoffset can be changed when first predefined condition satisfied. In this example, a first predefined condition is receiving a DCI indicating changing DRX parameter. In some embodiments, UE uses the first index of drx-startoffset at the beginning and changes to use a second set of drx-startoffset when the first predefined condition is satisfied. In some embodiments, UE uses the set of drx-startoffset indication by the DCI when the first predefined condition is satisfied.

4.4 Changing DRX Parameters According to a Changing Factor

In some embodiments, UE changes one or more DRX parameters according to a changing factor. In some embodiments, the changing factor is indicated by a DCI or a high layer signaling. In some embodiments, the DRX parameter includes at least one of the following: drx-onDuration Timer, drx-SlotOffset, drx-Inactivity Timer, drx-RetransmissionTimerDL, drx-RetransmissionTimerUL, drx-LongCycleStartOffset, drx-ShortCycle, drx-ShortCycleTimer, drx-HARQ-RTT-TimerDL, drx-HARQ-RTT-TimerUL, ps-Wakeup, ps-TransmitOtherPeriodicCSI, ps-TransmitPeriodicL1-RSRP, or drx-startOffset.

In some embodiments, UE receives a DCI or an L1 signaling or a high layer signaling indicates a changing factor A or changing factor index. In some embodiments, a DRX parameter value (Y_DRX) is modified (e.g., reset, adjusted, changed) according to changing factor A. For example, Y_DRX is changed to Y_DRX*A.

In some embodiments, A is greater than 0. As another example, DRX parameter is changed to Y_DRX+A. In some embodiments, A is less than drx-inactivityTimer. In some embodiments, DRX parameter after changing should be greater than or equal to 0. For example, DRX parameter is changed to Y_DRX−A.

In some embodiments, UE receives a first signaling indicates a changing DRX parameter indication or changing factor A or changing factor index used for drx-startoffset (or drx-longcyclestartoffset). In some embodiments, the drx-startoffset (or drx-longcyclestartoffset) Y_offset is changed to Y_offset+A. In some embodiments, the drx-startoffset (or drx-longcyclestartoffset) Y_offset is changed to mod ((Y_offset+A)/DRX cycle). In some embodiments, mod means modulo.

4.5 Changes DRX Parameters According to Change Period

In some embodiments, UE changes DRX parameter when a first predefined condition satisfied. In some embodiments, a first predefined condition includes (or associated with) at least a changing period. In some embodiments, UE changes DRX parameters according to a changing period. In some embodiments, a changing period is a time duration for one set of DRX parameters.

In some embodiments, a first predefined condition is satisfied when a changing period is finished. Changing period is finished means after a changing period.

In some embodiments, the changing period is configured by a high layer signaling or a DCI. In some embodiments, UE receives a high layer signaling, wherein the high layer signaling includes two sets of DRX parameters and/or a changing period. In some embodiments, UE uses the low index set of DRX parameters after receiving the configuration signaling. In some embodiments, UE changes to another DRX parameters after a first kind (or type) of changing period and/or and changes back to the low index DRX parameters after a second kind (or type) of changing period and continue changing DRX parameters according the pattern. In some embodiments, the first kind of changing period is the same as the second kind of changing period. In some embodiments, the first kind of changing period is different from the second kind of changing period.

In some embodiments, UE receives a high layer signaling, wherein the high layer signaling includes more than one set of DRX parameters and one changing period. In some embodiments, UE uses the mod(j/J) set of DRX parameters for the jth changing period. In some embodiments, J corresponds to a number of sets of DRX parameters. In some embodiments, UE receives a high layer signaling, wherein the high layer signaling includes more than one set of DRX parameters and a changing period. In some embodiments, UE uses the mod(j/J) set of DRX parameters for the jth changing period. In some embodiments, J corresponds to a number of sets of DRX parameters and the number of types (or kinds) of changing periods. In some embodiments, jth changing period means (j−1) changing periods have gone or current time is during jth changing period.

In some embodiments, a changing period includes at least one of the following: a number of DRX cycles, a time duration, or a bitmap. For example, UE is configured with two sets of DRX parameters and/or a first changing period includes a number of DRX cycle A and a second changing period includes a number of DRX cycle B. In other words, the UE uses low index of DRX parameters for A DRX cycle, after A DRX cycle, and/or UE will change DRX parameters to different DRX parameters. In some embodiments, a UE uses another DRX for B DRX cycle and changes back to the low index of DRX parameters after B DRX cycles.

Figure 6:
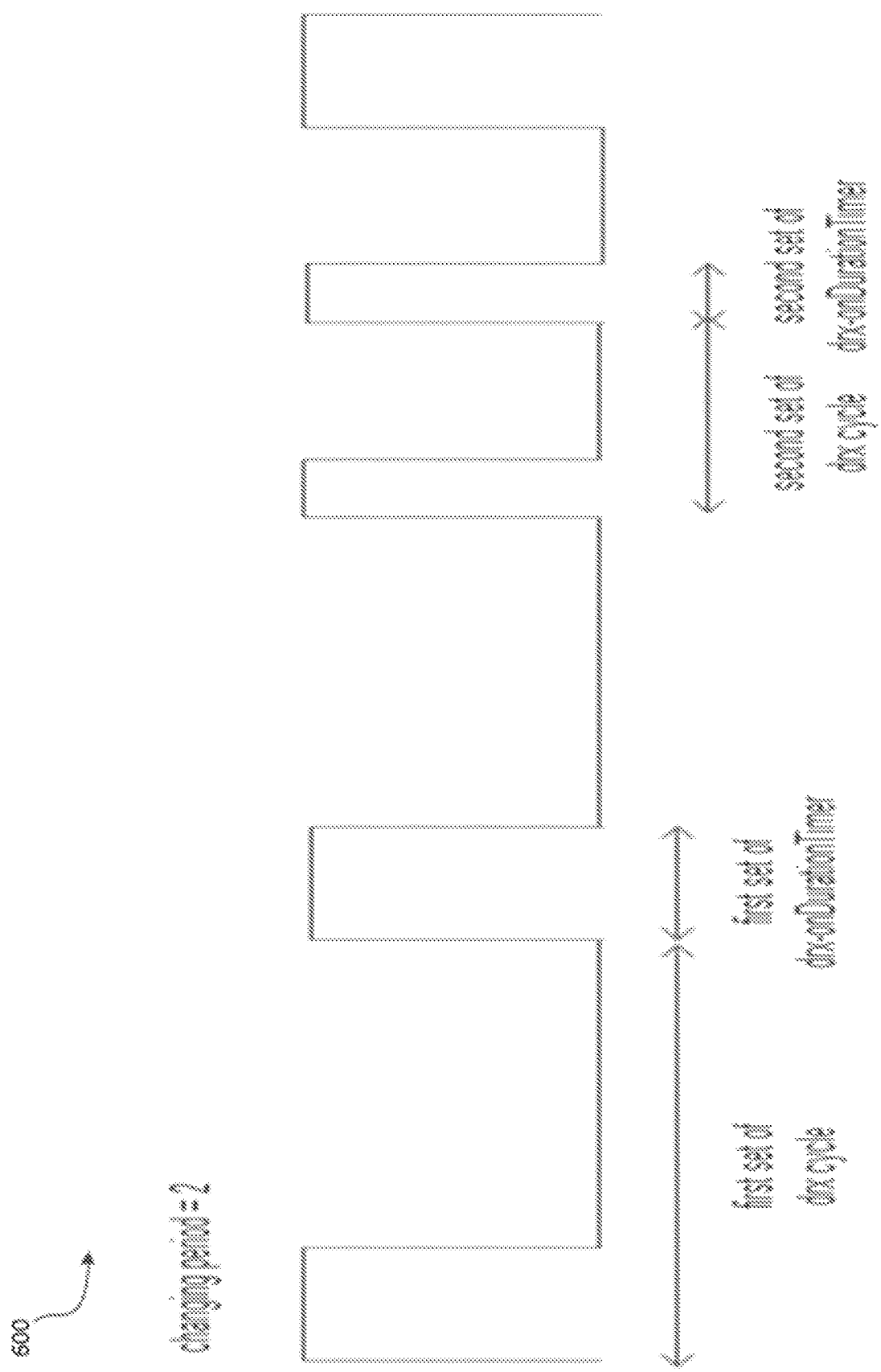
FIG. 6 is a timing diagram depicting an example mechanism for changing DRX parameters, in accordance with an embodiment of the present disclosure.

FIG. 6 is a timing diagram depicting an example mechanism for changing DRX parameters, in accordance with an embodiment of the present disclosure. In some embodiments, a changing period is configured by RRC signaling. In some embodiments, a changing period value is set to 2. In some embodiments, a UE may be configured to change behavior of the PDCCH monitoring according to a changing pattern. In some embodiments, a changing pattern may be where a UE is configured with two sets of DRX parameters, and the UE uses a first set of DRX parameters at the beginning. In some embodiments, a changing pattern may be where a UE, after 2 DRX cycles, uses the second set of DRX parameters for another 2 cycles and then uses the first set of DRX parameters. In some embodiments, a UE may repeat a changing pattern any number of times (e.g., 1, 2, 3, . . . , etc.).

In some embodiments, changing period is configured by a bitmap. In some embodiments, the bitmap indicates the changing pattern of the DRX parameters.

In some embodiments, UE is configured with two sets of DRX parameters and a changing period of a bitmap '00111'. For example, UE uses index 0 DRX parameters for 2 DRX cycle, after 2 DRX cycle, UE will change DRX parameters to DRX parameters with index 1. In some embodiments, UE use a DRX parameter with index 1 for 3 DRX cycles and change back to the index 0 DRX parameters.

In some embodiments, the changing period or a changing pattern is configured by a high layer signaling or a DCI. In some embodiments, the changing pattern indicates changing parameters. For example, RRC configured a changing pattern '011101' and a changing period P. In some embodiments, a UE may use set 0 of DRX parameters for first period, use set 1 for second to four periods, use set 0 for five period, set 1 for six period, and/or back to the pattern.

In some embodiments, the changing period and a changing factor is configured by a high layer signaling or a DCI. In some embodiments, if UE receives or triggers the changing period, then UE may change one or more DRX parameters according to changing factor every changing period.

5. First Predefined Condition

In some embodiments, a first predefined condition may be associated with at least one of the following: DCI, high layer signaling, DL assignment, UL grant, a PDSCH, a transport block, an ACK/NACK, a DRX parameter, SPS configuration, WUS, a timer, RNTI, UE capability, a changing period, or UE assistance information.

In some embodiments, a first predefined condition associated with at least a DCI. For example, a first predefined condition is satisfied by receiving a DCI carried indication information. In some embodiments, the indication information includes at least one of the following: a start second active time indication, a change DRX parameter indication, a second active time parameter indication, an activate information of a set of DRX parameter, a deactivate information of a set of DRX parameter, a maximum value information of one or more DRX parameters or a DRX parameters indication. In some embodiments, a first predefined condition is satisfied by receiving a DCI carrying an indication information which is different from the current information. For example, a first predefined condition is satisfied by receiving a DCI carrying an indication information of DRX parameters which are different from the current used set of DRX parameters. In some embodiments, a first predefined condition is satisfied by receiving a DCI carrying an indication information of maximum value information of one or more DRX parameters. In some embodiments, UE change the one or more DRX parameters to the indicated maximum value if the current used one or more DRX parameters is greater than the indicated maximum value when the first predefined condition is satisfied. In some embodiments, UE stops using the current DRX parameters if the current used one or more DRX parameters is greater than the indicated maximum value.

In some embodiments, a UE may determine at least one set of DRX parameters among the N sets of DRX parameters when the predefined condition is satisfied comprises at least one of the following: activate or use the set of DRX parameters when a first kind of predefined condition is satisfied, or deactivate or stop using the set of DRX parameters when a second kind of predefined condition is satisfied.

In some embodiments, first kind predefined condition includes at least receiving a DCI or MAC CE carrying an activation indication of one or more sets of DRX setting. In some embodiments, second kind predefined condition include at least receiving a DCI or MAC CE carrying a deactivation indication of one or more sets of DRX setting.

In some embodiments, the indication information is carried by at least one of the following: a DCI, high layer signaling, or PDSCH.

In some embodiments, a first predefined condition is associated with at least a high layer signaling. In some embodiments, the high layer signaling may correspond to an RRC signaling or a MAC CE signaling. For example, a first predefined condition is satisfied by receiving a high layer signaling.

In some embodiments, a first predefined condition is associated with at least a DL assignment. For example, a first predefined condition is satisfied by determining that a DL assignment has not been received during a time duration. In some embodiments, the time duration corresponds to the time when a drx-onDurationTimer is running. In some embodiments, a first predefined condition is associated with at least a UL grant. For example, a first predefined condition is satisfied by determining that a UL assignment has not been received during a time duration. In some embodiments, the time duration is time when drx-onDurationTimer is running.

In some embodiments, a first predefined condition is associated with at least a DL assignment and/or a UL grant. For example, a first predefined condition is satisfied by determining that a DL assignment and/or UL grant has not been received during a time duration. In some embodiments, the time duration is time when drx-onDurationTimer is running. In some embodiments, a first predefined condition is associated with at least a PDSCH. For example, a first predefined condition is satisfied by successfully decoding a PDSCH.

In some embodiments, a first predefined condition is associated with at least an ACK. For example, first predefined condition satisfied include UE send an ACK. In some embodiments, a first predefined condition is associated with at least a NACK. For example, a first predefined condition is satisfied by the UE sending a NACK.

In some embodiments, a first predefined condition is associated with at least a DRX parameter. For example, a first predefined condition is satisfied by a UE starting a drx-onDurationTimer. As another example, a first predefined condition is satisfied by a drx-inactivityTimer expiring. As another example, a first predefined condition is satisfied by a drx-onDurationTimer expiring.

In some embodiments, a first predefined condition is associated with at least a timer. For example, a first predefined condition is satisfied when a timer expires. In some embodiments, a first predefined condition is associated with at least a UE capability. For example, a first predefined condition is satisfied to include UE capability support a second active time. As another example, a first predefined condition is satisfied to include UE capability support a dynamic change DRX parameters. In some embodiments, a first predefined condition is associated with at least a UE assistance information. For example, a first predefined condition is satisfied to include receiving a UE assistance information.

5.1 First Predefined Condition Associated with a DCI Configuration

In some embodiments, a UE receives a high layer signaling. In some embodiments, the high layer signaling includes one or more DRX parameters. In some embodiments, the UE monitors a PDCCH during an active time. In some embodiments, an active time is determined by one or more DRX parameters. In some embodiments, a UE changes one or more DRX parameters when a first predefined condition is satisfied. In some embodiments, a UE changes one or more DRX parameters during an active time when a first predefined condition is satisfied.

In some embodiments, a first predefined condition includes receiving a DCI. In some embodiments, the DCI format includes at least one of the following: DCI format 0-0, DCI format 0-1, DCI format 0-2, DCI format 1-0, DCI format 1-1, DCI format 1-2, DCI format 2-0, DCI format 2-6. in some embodiments, the DCI is scrambled by at least one of the following: C-RNTI, CS-RNTI, MCS-C-RNTI, SFI-RNTI, PS-RNTI, or a new RNTI. In some embodiments, the new RNTI is used to indicate a start second active time or change DRX parameters.

In some embodiments, the DCI may indicate at least one of the following: a start second active time indication, a second active time parameter indication, a change DRX parameters indication, or a DRX parameters indication.

In some embodiments, the indication is indicated in a field of a DCI. In some embodiments, the field is a special field for the indication or re-use the existing field. In some embodiments, at least the following existing field can be re-use for the indication: a modulation and coding scheme of transport block 1, new data indicator of transport block 1, redundancy version of transport block 1, a HARQ process number, antenna port(s), Demodulation Reference Signal (DMRS) sequence initialization, a Secondary Cell (SCell)

dormancy indication, a minimum applicable scheduling offset indicator, a wake up indication.

5.2 Group 'C' Embodiment(s)

In this embodiment, the first predefined condition is associated with a DCI. In some embodiments, the DCI is DCI format 2-6, the DCI is scrambled by PS-RNTI, and/or a new RNTI. In some embodiments, the DCI includes at least changing DRX parameter indication and/or start second active time indication for one or more UEs. In some embodiments, the DCI also includes a wake-up indication or a SCell dormancy indication.

In some embodiments, DCI is a first kind DCI. In some embodiments,

In some embodiments, a first kind DCI may include at least DCI carries information for a group of UEs. For example, DCI format 2-0, DCI format 2-1, or DCI format 2-6. In some embodiments, a second kind DCI may include DCI carrying information for a specified UE. For example, DCI format 0-1, DCI format 1-1, DCI format 0-2, and/or DCI format 1-2. In some embodiments, a first kind DCI may include at least one of the following: DCI format 0-0, and/or DCI format 1-0. In some embodiments, a first kind DCI may include at least one of the following: DCI format 0-1, DCI format 1-1, and/or DCI format 2-6.

In some embodiments, the DCI only includes changing DRX parameter indication and/or a start second active time indication. In other words, this means a wake-up indication, SCell dormancy indication cannot be carried by the DCI.

In some embodiments, UE monitors PDCCH for detection of DCI in a time duration. In some embodiments, during the time duration, UE monitors PDCCH for detection of the DCI according to the search space set configuration for the DCI. In some embodiments, the time duration includes at least one of the following: a start time; an end time; a duration value; and/or an offset value.

In some embodiments, the time duration is indicated by at least one of the following: UE capability; high layer signaling; or a DCI. In some embodiments, the time duration includes at least an offset value. In some embodiments, UE reports a UE capability for an active DL bandwidth part (BWP) a requirement of offset value (e.g., X slots) prior to the beginning of a slot where the UE would start the drx-onDurationTimer or prior to the beginning of the start time of second active time. In some embodiments, the UE is not required to monitor PDCCH for detection of DCI during the X slots. In some embodiments, the X slots is used for UE in preparation of monitoring PDCCH.

Figure 7:
FIG. 7 is a table of example minimum time gap X values, in accordance with an embodiment of the present disclosure.

FIG. 7 is a table 700 of example minimum time gap X values, in accordance with an embodiment of the present disclosure. In some embodiments, X corresponds to the requirement of the SCS of the active DL BWP.

In some embodiments, an offset value is determined (e.g., accessed, identified, etc.) by high layer signaling or a predefined value. In some embodiments, the time duration includes at least a start time. In some embodiments, the start time indicates when to start the time duration. In some embodiments, the start time is indicated by an RRC signaling. In some embodiments, the time duration is started right after drx-inactivityTimer or drx-onDurationTimer expire.

In some embodiments, the time duration includes at least a duration value. In some embodiments, the duration value is associated with at least one of the following: a drx-longcyclestartoffset, a drx-inactivityTimer, a drx-onDurationTimer.

6. Restriction or Configuration of DRX Parameters

In some embodiments, the maximum available value of a DRX parameter of a set of DRX parameters is associated with at least one of the following: a UE capability, a UE feature, an RRC signaling, a 5G Quality of Service Identifier (5QI), or a Sub-Carrier Space (SCS).

In some embodiments, a DRX parameter is associated with at least one of the following: a UE capability, a UE feature, an RRC signaling, a 5QI, an SCS, a Semi-Persistent Scheduling (SPS) configuration, a configure grant configuration, a transmission and reception without dynamic scheduling parameters, a frame structure, or a traffic parameters.

In some embodiments, a DRX parameter is associated with one or more traffic parameters. For example, drx-onDurationTimer is associated with a traffic parameter, wherein the traffic parameter is an offset range. In some embodiments, Drx-onDurationTimer is the same as or larger than the offset range. In some embodiments, offset range is the range of the offset, for example, offset value is between 5 ms and 10 ms, then the offset range is 5 ms (i.e., 10 ms−5 ms=5 ms). In some embodiments, offset is the jitter value of the traffic.

As another example, drx-longcyclestartoffset is associated with a traffic parameter, wherein the traffic parameter is a traffic period. In some embodiments, a DRX long cycle is same as or smaller than the traffic period.

In some embodiments, a traffic parameter includes at least one of the following: an offset range, a traffic periodicity, a traffic packet size, or a traffic packet delay budget. In some embodiments, a DRX parameter is associated with an SPS configuration. For example, DRX cycle is same as periodicity of configured downlink assignment for SPS. As another example, a DRX cycle is less than the periodicity of configured downlink assignment for SPS.

In some embodiments, the maximum available value of a DRX parameter is associated with at least UE capability. For example, if UE capability report supports XR traffic or report supports a traffic packet delay budget less than C, then the maximum available value of a DRX parameter is less than first threshold. Otherwise, the maximum available value of a DRX parameter is less than second threshold. In some embodiments, first threshold and second threshold are positive number and greater than or equal to 0. In some embodiments, the first threshold is less than or equal to the second threshold. In some embodiments, C is a positive number greater than 0.

In some embodiments, the maximum available value of a DRX parameter is associated with at least UE capability. For example, an RRC signaling indicates a XR parameter, the maximum available value of a DRX parameter is less than first threshold. Otherwise, the maximum available value of a DRX parameter is less than second threshold. In some embodiments, XR parameter may include at least one of the following: an enable XR signaling, a second active time signaling, or more than one set of DRX parameters configuration signaling.

In some embodiments, a maximum available value of a re-transmission time is associated with at least one of the following: a UE capability, a UE feature, an RRC signaling, a 5QI, or an SCS.

In some embodiments, the maximum available value of a re-transmission time is associated with at least UE capability. For example, if UE capability report support XR traffic or report support a traffic packet delay budget less than C, then the maximum available value of a re-transmission time is less than a third threshold. In some embodiments, the third threshold is a positive number and greater than 0 and less than 4. In some embodiments, the third threshold is associated with a DRX parameters. In some embodiments, the third threshold is associated with at least UE capability.

6.1 Short DRX Parameters

In some embodiments, at least one of the following first parameters are different between short DRX and long DRX if first predefined condition satisfied: Search space set group, minimum k0/k2, a skipping duration, a CORESET, a valid RNTI to monitor, a drx-retransmissionTimer, a drx-inactivityTimer, or a drx-onDurationTimer.

In some embodiments, a start drx-onDurationTimer for long DRX and stop use short DRX if a first predefined condition is satisfied. In some embodiments, a first predefined condition includes at least: (SFN×10)+subframe number modulo (drx-LongCycle)=drx-StartOffset.

7. Decrease Active Time

In some embodiments, a UE can decrease active time if a first predefined is condition satisfied. In some embodiments, a decrease active time includes at least one of the following: a not start next drx-onDurationTimer, or a not start second active time. In some embodiments, a first predefined condition includes at least one of the following: a detect a DCI during active time, a send an ACK, DRX cycle is less than periodicity of a traffic, a decrease active time indication, a skipping indication, or a not wake up indication.

For example, if UE successfully decodes a PDSCH or sends an ACK during the first DRX cycle, then UE may not start drx-onDurationTimer for next DRX cycle. As another example, if WUS is configured and UE successfully decodes a PDSCH or sends an ACK during the first DRX cycle, UE may not monitor WUS and not start drx-onDurationTimer for next DRX cycle. As another example, if WUS is configured and UE does not detect a DCI during the drx-onDurationTimer is running ("DRX On" state of first DRX cycle), then UE may not monitor WUS and start drx-onDurationTimer for next DRX cycle.

Figure 8:
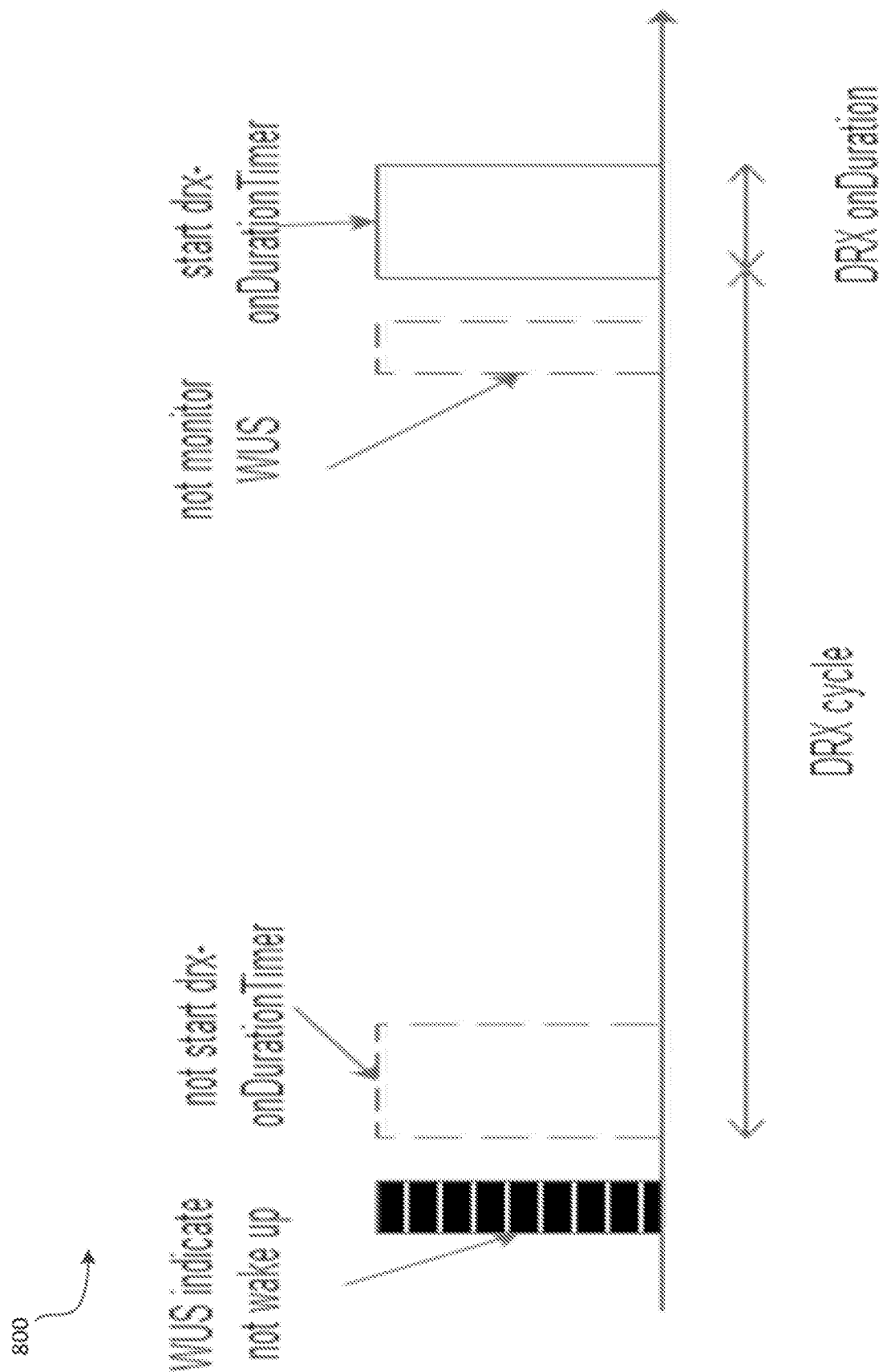
FIG. 8 is a timing diagram depicting an example mechanism for changing DRX parameters, in accordance with an embodiment of the present disclosure.

As another example, FIG. 8 is a timing diagram depicting an example mechanism for changing DRX parameters, in accordance with an embodiment of the present disclosure. In some embodiments, if WUS is indicated not to start drx-onDurationTimer in the first DRX cycle, then UE may not monitor WUS and/or start drx-onDurationTimer for next DRX cycle.

8. Method(s) for Changing One or More DRX Parameters

FIG. 9 is a flow diagram depicting a method for PDCCH monitoring, in accordance with some embodiments of the present disclosure. Additional, fewer, or different operations may be performed in the method depending on the particular embodiment. In some embodiments, some or all operations of method 900 may be performed by a wireless communication node, such as BS 202 in FIG. 2. In some operations, some or all operations of method 900 may be performed by a wireless communication device, such as UE 204 in FIG. 2. Each operation may be re-ordered, added, removed, or repeated.

As shown, the method 900 includes, in some embodiments, the operation 902 of receiving, by a wireless communication device (e.g., UE 204 in FIG. 2), a high layer signaling including N sets of discontinuous reception (DRX) parameters; wherein the N is an integer greater than or equal to 1. The method 900 includes, in some embodiments, the operation 904 of performing, by the wireless communication device, at least one of the following behaviors when a predefined condition is satisfied. The method 900 includes, in some embodiments, the operation 906 of changing a physical downlink control channel (PDCCH) monitoring behavior. The method 900 includes, in some embodiments, the operation 908 of determining at least one set of DRX parameters among the N sets of DRX parameters. The method 900 includes, in some embodiments, the operation 910 of monitoring the PDCCH during an active time that is determined according to the set of DRX parameters.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A wireless communication method, comprising:
receiving, by a wireless communication device, a high layer signaling including N sets of discontinuous reception (DRX) parameters, wherein the N is an integer greater than or equal to 1;
determining, by the wireless communication device, an active time according to at least one set of DRX parameters; and
monitoring, by the wireless communication device a physical downlink control channel (PDCCH) during a second active time when a predefined condition is satisfied,
wherein a search space set group associated with the active time is different from a second search space set group associated with the second active time, or a control resource set (CORESET) associated with the active time is different from a second CORESET associated with the second active time.

2. The wireless communication method of claim 1, further comprising:
receiving, by the wireless communication device via downlink control information (DCI) or a high layer signaling, an indication of one or more changing factors or one or more changing periods.

3. The wireless communication method of claim 1, further comprising monitoring, by the wireless communication device, the PDCCH during the active time that is determined according to the at least one set of DRX parameters, wherein monitoring the PDCCH during the active time according to the at least one set of DRX parameters comprises at least one of:
changing by the wireless communication device responsive to receiving an indication information carried by downlink control information (DCI), an indicated set of DRX parameters which is different from a current used set of DRX parameters, or
changing one or more DRX parameters in the at least one set of DRX parameters according to the one or more changing factors or the one or more changing periods.

4. The wireless communication method of claim 1, wherein the predefined condition is associated with at least one of a downlink control information (DCI), a high layer signaling, a downlink (DL) assignment, an uplink (UL) grant, a physical downlink shared channel (PDSCH), a transport block, an acknowledgement (ACK)/negative ACK (NACK), a DRX parameter, a semi-persistent scheduling (SPS) configuration, a wake-up signal (WUS), a timer, a radio network temporary identifier (RNTI), a capability of the wireless communication device, a changing period, a scheduling request (SR), or an assistance information of the wireless communication device.

5. The wireless communication method of claim 1, wherein the set of DRX parameters include at least one of a drx-SlotOffset, a drx-Inactivity Timer, a drx-LongCycleStartOffset, or a drx-onDuration Timer.

6. The wireless communication method of claim 1, wherein the second active time is associated with at least one of: a start time, a duration, a period, a time value, an offset, or a timer.

7. The wireless communication method of claim 6, further comprising:
receiving, by the wireless communication device, an indication of a parameter of the second active time via downlink control information (DCI) or a high layer signaling.

8. The wireless communication method of claim 1, wherein the second active time does not start at the active time.

9. The wireless communication method of claim 1, wherein at least one of:
a search space set group associated with the active time is different from a second search space set group associated with the second active time,
a minimum k0/k2 associated with the active time is different from a second minimum k0/k2 associated with the second active time,
a skipping duration associated with the active time is different from a second skipping duration associated with the second active time,
a control resource set (CORESET) associated with the active time is different from a second CORESET associated with the second active time,
a radio network temporary identifier (RNTI) to monitor in the active time is different from a second RNTI to monitor in the second active time,
a set of DRX parameters associated with the active time is different from a second set of DRX parameters associated with the second active time,
a drx-retransmissionTimer in the active time is different from a second drx-retransmissionTimer in the second active time, or
a drx-InactivityTimer in the active time is different from a second drx-Inactivity Timer in the second active time.

10. The wireless communication method of claim 1, further comprising determining the at least one set of DRX parameters among the N sets of DRX parameters.

11. The wireless communication method of claim 10, wherein determining the at least one set of DRX parameters among the N sets of DRX parameters comprises:
using, by the wireless communication device responsive to receiving the high layer signaling, a default set of DRX parameters.

12. The wireless communication method of claim 11, wherein the default set of DRX parameters corresponds to a set of DRX parameters with a lowest index.

13. The wireless communication method of claim 10, wherein determining the at least one set of DRX parameters among the N sets of DRX parameters comprises at least one of:
changing one or more DRX parameters in the at least one set of DRX parameters according to the one or more changing factors or the one or more changing periods, or
changing the at least one set of DRX parameters according to the one or more changing periods.

14. The wireless communication method of claim 1, wherein monitoring the PDCCH during the second active time is after at least one of:
a last symbol or a slot when a predefined condition is satisfied,
the last symbol or the last slot when the high layer signaling is received,
sending, by the wireless communication device, an acknowledgement (ACK) responsive to receiving an indication signaling,
sending, by the wireless communication device, an uplink (UL) signal responsive to receiving an indication signaling,
sending, by the wireless communication device, an uplink (UL) signal,
an expiration of a drx-retransmission Timer,
an expiration of a drx-InactivityTimer, or
a delay.

15. The wireless communication method of claim 14, wherein the delay is associated with at least one of a sub-carrier space (SCS), a capability of the wireless communication device, a timer, or a radio resource control (RRC) signaling.

16. A wireless communication device, comprising:
at least one processor configured to:
receive, via a transmitter, a high layer signaling including N sets of discontinuous reception (DRX) parameters; wherein the N is an integer greater than or equal to 1;
determine an active time according to at least one set of DRX parameters; and
monitor a physical downlink control channel (PDCCH) during a second active time when a predefined condition is satisfied,
wherein a search space set group associated with the active time is different from a second search space set group associated with the second active time, or a control resource set (CORESET) associated with the active time is different from a second CORESET associated with the second active time.

17. A wireless communication method, comprising:
sending, by a wireless communication node to a wireless communication device, a high layer signaling including N sets of discontinuous reception (DRX) parameters; wherein the N is an integer greater than or equal to 1,
wherein the wireless communication device determines an active time according to at least one set of DRX parameters, and monitors a physical downlink control channel (PDCCH) during a second active time when a predefined condition is satisfied,
wherein a search space set group associated with the active time is different from a second search space set group associated with the second active time, or a control resource set (CORESET) associated with the active time is different from a second CORESET associated with the second active time.

18. A wireless communication node, comprising:
at least one processor configured to:
send, via a transmitter to a wireless communication device, a high layer signaling including N sets of discontinuous reception (DRX) parameters; wherein the N is an integer greater than or equal to 1,
wherein the wireless communication device determines an active time according to at least one set of DRX parameters, and monitors a physical downlink control channel (PDCCH) during a second active time when a predefined condition is satisfied,
wherein a search space set group associated with the active time is different from a second search space set group associated with the second active time, or a control resource set (CORESET) associated with the active time is different from a second CORESET associated with the second active time.

* * * * *